(12) United States Patent
Rakhunde et al.

(10) Patent No.: US 11,401,753 B2
(45) Date of Patent: Aug. 2, 2022

(54) CABLE MANAGEMENT ON MARINE DRILLING RISERS

(71) Applicant: Cameron International Corporation, Houston, TX (US)

(72) Inventors: Vikas Rakhunde, Cypress, TX (US); Steven Shimonek, League City, TX (US); Nicolas Arteaga, Jersey Village, TX (US); Matthew Givens, Houston, TX (US); Harold Tenorio, Houston, TX (US); Jon Tyler, Houston, TX (US); John Zahl, Kristiansand (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 97 days.

(21) Appl. No.: 16/750,230

(22) Filed: Jan. 23, 2020

(65) Prior Publication Data

US 2021/0230948 A1    Jul. 29, 2021

(51) Int. Cl.
*E21B 17/01*    (2006.01)
*E21B 19/00*    (2006.01)
*F16L 3/10*    (2006.01)
*B63B 21/50*    (2006.01)

(52) U.S. Cl.
CPC .......... *E21B 19/006* (2013.01); *B63B 21/502* (2013.01); *E21B 17/01* (2013.01); *F16L 3/10* (2013.01)

(58) Field of Classification Search
CPC .... E21B 19/002; E21B 19/004; E21B 19/006; E21B 19/09; E21B 17/01; E21B 17/026; E21B 17/085; E21B 17/0853; B63B 21/502; F16L 3/10
See application file for complete search history.

(56) References Cited

U.S. PATENT DOCUMENTS

| 2,705,603 | A | * | 4/1955 | Bitz | ...................... H01Q 1/1228 248/541 |
| 3,749,429 | A | | 7/1973 | Hauber | |
| 4,249,610 | A | * | 2/1981 | Loland | .................. E21B 17/012 166/352 |
| 5,092,711 | A | * | 3/1992 | Langner | .............. E21B 43/0107 166/341 |
| 7,988,104 | B1 | * | 8/2011 | Cook | ...................... E21B 17/01 248/68.1 |

(Continued)

FOREIGN PATENT DOCUMENTS

| EP | 2484859 A1 | 8/2012 |
| WO | 2013140200 A1 | 9/2013 |
| WO | 2016141194 A1 | 9/2016 |

OTHER PUBLICATIONS

Cameron Drilling Products Overview Catalog, LoadKing Riser p. 25, 2013, 64 pages.

(Continued)

*Primary Examiner* — Benjamin F Fiorello
*Assistant Examiner* — Stacy N Lawson
(74) *Attorney, Agent, or Firm* — Kelly McKinney

(57) ABSTRACT

A drilling riser cable management system includes a plurality of clamping mechanisms pre-installed on riser joints and a robotic arm. The robotic arm has a cable handling mechanism that is configured to securely install the cable on each clamping mechanism without relying on human manipulation of the cable during installation.

8 Claims, 10 Drawing Sheets

(56) References Cited

U.S. PATENT DOCUMENTS

| | | | |
|---|---|---|---|
| 8,678,088 B2 | 3/2014 | Brown | |
| 8,783,630 B2 | 7/2014 | Gronlund et al. | |
| 9,212,525 B2 | 12/2015 | Sessions et al. | |
| 9,683,413 B1* | 6/2017 | Smith | E21B 17/1035 |
| 2008/0308281 A1* | 12/2008 | Boutwell, Jr. | E21B 17/026 |
| | | | 166/385 |
| 2010/0175885 A1* | 7/2010 | McMiles | E21B 17/01 |
| | | | 166/360 |
| 2012/0152556 A1 | 6/2012 | Hensley et al. | |
| 2016/0237758 A1* | 8/2016 | Whitefield | E21B 17/01 |
| 2016/0356102 A1 | 12/2016 | Meeks | |
| 2017/0335682 A1* | 11/2017 | Clark | E21B 17/01 |

OTHER PUBLICATIONS

Cameron General Catalog pp. 14-15, 2005-2006, 2 pages.
International Search Report and Written Opinion issued in International Patent Application No. PCT/US2021/014850 dated May 6, 2021; 10 pages.

* cited by examiner

CABLE MANAGEMENT ON MARINE DRILLING RISERS

TECHNICAL FIELD

The present disclosure relates to systems and methods for cable management when deploying marine drilling riser. More specifically, the present disclosure relates to systems and method for clamping cable, such as multiplex (MUX) electrical cable to drilling riser joints when running the drilling riser.

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

A drilling riser includes a relatively large-diameter pipe that connects a subsea blowout preventer (BOP) stack to a surface rig. The large-diameter pipe is configured to take mud returns to the surface. In addition to the large-diameter main tube, many drilling risers include a plurality of high-pressure external auxiliary lines. These auxiliary lines can include high pressure choke and kill lines for circulating fluids to the BOP, and usually power and control lines for the BOP. In marine drilling applications, an umbilical cord is used to transfer electrical signals from the topside equipment to the BOP equipment on the sea floor. This cord is typically attached to the drilling riser by means of clamp(s) that are attached to the auxiliary line(s) of each joint of drilling riser. This clamping connection is typically performed manually in the moonpool area, and is time consuming due to the nature of the umbilical(s) and the common bolting and/or pin-type connections used on the clamps.

In conventional arrangements, clamps include a fixed clamp and a removable clamp. The fixed clamp is attached on an auxiliary line and the removable clamp is either permanently installed on fixed clamp or attached to the fixed clamp in the moonpool area while running the riser. Removable clamps consist of two halves where one half is stationary and other is hinged at one side to allow the cable to slide into the clamp and then the hinged arm is rotated manually to hold the cables in place. There is at least one clamp per riser joint to be installed in moonpool area, which consumes productive time and also relies on a human deployed in a basket to perform the assembly tasks.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a drilling riser cable management system is described that is configured to clamp an electrical cable to riser joints for use in a drilling process. The system includes: a plurality of clamping mechanisms that are pre-installed to drilling riser joints prior to being run; and a mechanical cable handling mechanism configured to securely install the electrical cable to each of the clamping mechanisms without relying on human manipulation of the cable.

According to some embodiments, the system also includes a robotic arm mounted to the mechanical cable handling mechanism. The robotic arm can be configured to move the cable handling mechanism to a location in the proximity of a clamping mechanism. A video imaging system can be included that is configured to capture images to facilitate secure installation of the cable to each of the clamping mechanisms. The electrical cable can be a MUX cable configured to transfer electrical signals from topside equipment to blowout preventer (BOP) equipment.

According to some embodiments, each clamping mechanism includes a spring biased hinged member that is actuated at least in part by engagement of a shaped surface on the handling mechanism such as a cam surface.

According to some embodiments, each clamping mechanisms includes two cam-cleat members each being spring biased towards a position configured to grip the electrical cable.

According to some embodiments, each clamping mechanisms includes one or more flexible gates configured to retain the electrical cable within a space formed within the clamping mechanism, and an elastomeric material configured to provide friction that resists longitudinal slipping of the electrical cable.

In some cases, the clamping mechanisms are fixed to an auxiliary line of a riser joint. In other cases, they can be mounted in a slot formed in a flange of a riser joint.

According to some embodiments, a method of clamping an electrical cable to riser joints is described. The method includes actuating a mechanical cable handling mechanism with a robotic arm. The actuation securely installs an electrical cable onto a clamping mechanism that is mounted to a drilling riser joint, while the riser joint is being suspended from a drill floor. The installing of the electrical cable onto the first clamping mechanism does not rely on human manipulation of the cable.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
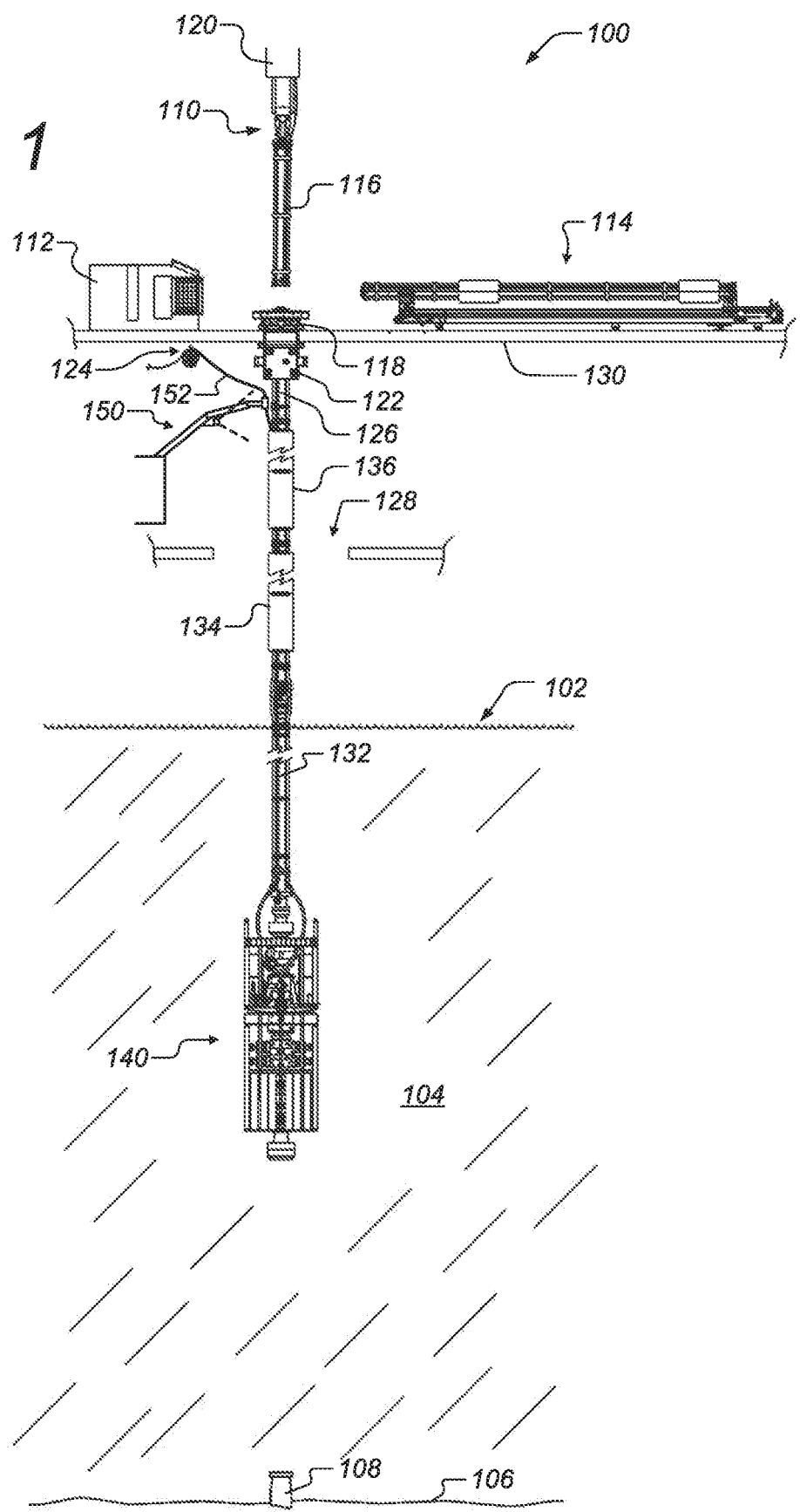
FIG. 1 is a side view diagram showing a drilling system with a cable management system deployed a marine wellsite, according to some embodiments.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Like reference numerals are used herein to represent identical or similar parts or elements throughout several diagrams and views of the drawings.

In offshore drilling applications, an umbilical cord or cable is used to transfer electrical signals and power from the topside equipment to the blowout preventer equipment on the sea floor. This cable, also referred to herein as a multiplex (MUX) cable, is typically attached to the drilling riser string by means of clamp(s). The clamps are attached to the auxiliary line(s) of each joint of drilling riser. Conventionally, the connection has been typically performed manually in the moonpool area and is very time consuming due to the nature of the umbilical(s) and the bolting and/or pin type connections used on the clamps. According to some embodiments, an improved technique includes reconfiguring the means for attaching the umbilical(s) to the riser string.

According to some embodiments, manual operation can be avoided and the automated robotic arm can be used that is equipped with a cam surface or other mechanism to install the mux cable into the clamp and lock it in position. Such embodiments can provide benefits including saving time and reducing reliance on handling of cables and/or clamps from a human deployed in a basket.

FIG. 1 is a side view diagram showing a drilling system with a cable management system deployed at a marine wellsite, according to some embodiments. The drilling system 100 is being deployed on a vessel, such as a drillship, or on a floating platform positioned above subsea wellhead 108 on sea floor 106. According to some other embodiments, the drilling system 100 is being deployed from a fixed platform above wellhead 108. Drilling system 100 is shown lowering BOP stack 140 down through sea water 104 for connection to wellhead 108. The BOP stack 140 can include various components such as a wellhead connector, blowout preventers, annular diverters, subsea flexjoint(s) and riser adapter(s). Above BOP stack 140 are a number of riser joints below seawater surface 102 of which riser joint 132 is shown. Shown below drill floor 130 and passing through moon pool 128 are further riser joints 134, 136 and 126. Riser joints 134 and 136 are shown with buoyancy modules. Mux cable line 152 is shown being deployed below drill floor 130 via a wheel 124. Diverter 122 is also visible below rotory table and drill floor 130. Above the drill floor 130 is "dog house" 112 and spider 118 which is shown currently holding the uppermost flange of riser joint 126. The riser running tool 110 is shown holding the next riser joint 116 above the spider 118. The riser running tool 110 is being deployed by top drive system 120. Also shown on the right side is another riser joint 114 in the horizontal position that can be deployed by the riser running tool following the attachment of riser joint 116 to riser joint 126 and the lowering or running of riser joint 116. According to some embodiments, a cable management system 150 is deployed on in the moonpool area and is configured to attach mux cable 152 to a series of clamps installed along the drilling riser string.

Figure 2:
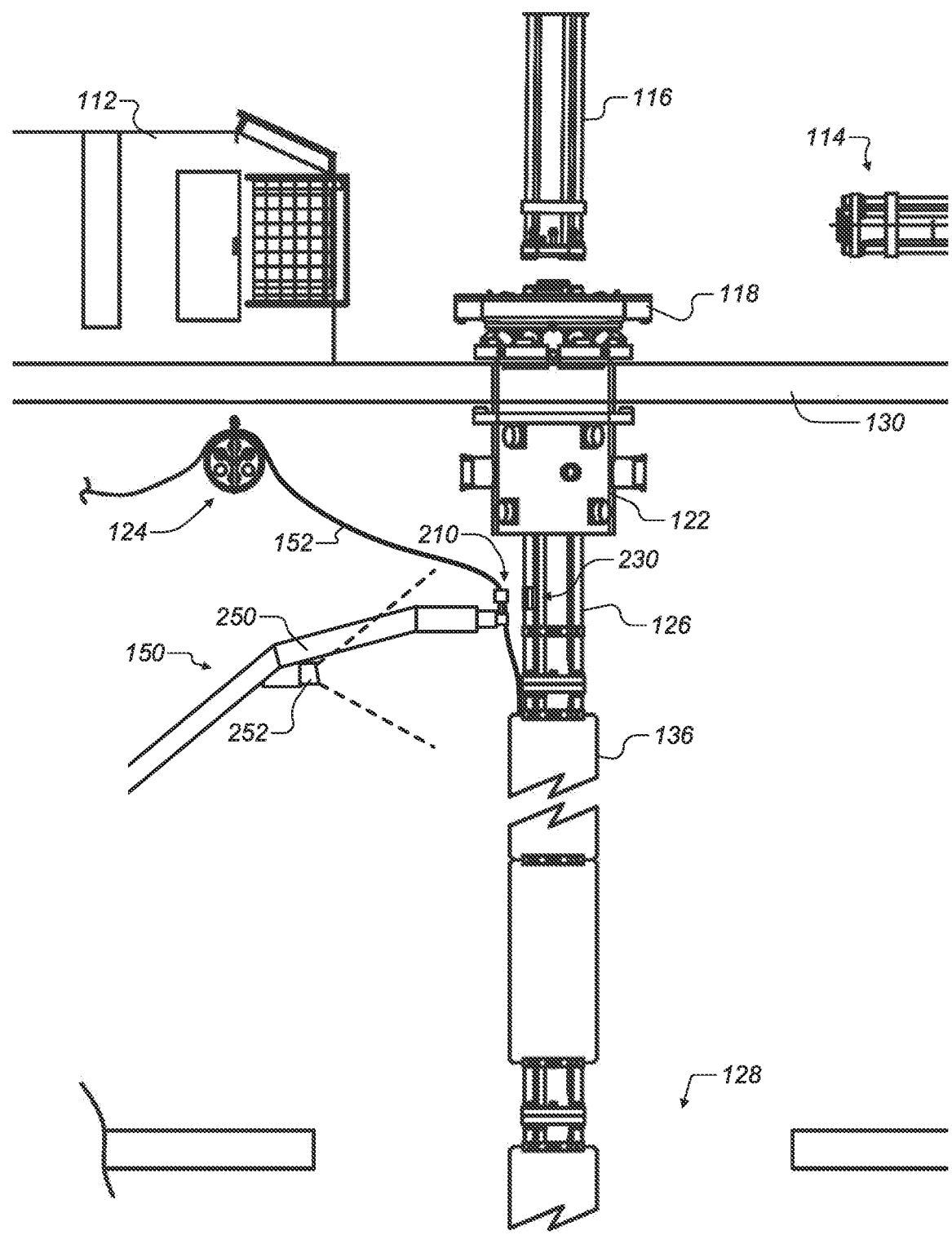
FIG. 2 is a side view diagram showing further detail of a cable management system configured to securely attach cable(s) to marine drilling riser, according to some embodiments.

FIG. 2 is a side view diagram showing further detail of a cable management system configured to securely attach cable(s) to marine drilling riser, according to some embodiments. The cable management system 150 includes a robotic arm 250 that has a cable handler 210 disposed at its distal end. The cable handler 210 is configured to securely fasten the mux cable 152 onto clamp 230 that is pre-installed to the drilling riser joint 126. According to some embodiments, the system 150 also include a video camera 252 that has a field of view, depicted by the dashed lines, that provides a view to display to an operator of the cable 152, the cable handler 210, clamp 230 and riser joint 126. According to some embodiments the camera 252 can be used by automated computer control to provide partially automated or fully automated installation of the cable 152 on to clamp 230. According to some embodiments, one or more additional video cameras are installed on the moonpool side frame. Such cameras can be installed and used in addition to the arm-mounted camera 252, or instead of camera 252.

Figure 3A:
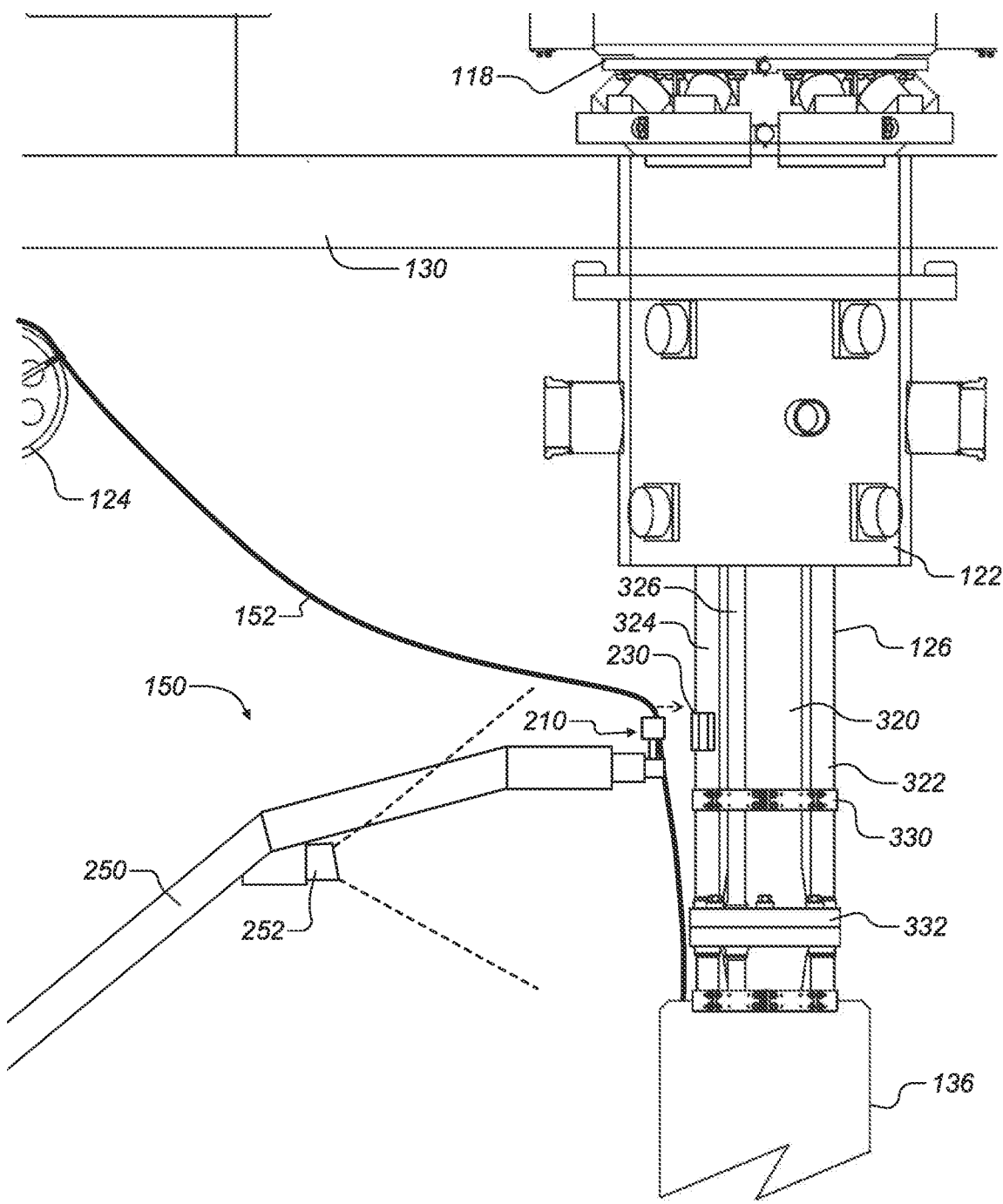
FIGS. 3A-3C are a series of side views showing further details of the operation of a cable management system to securely install cable(s) to marine drilling riser, according to some embodiments.
Figure 3B:
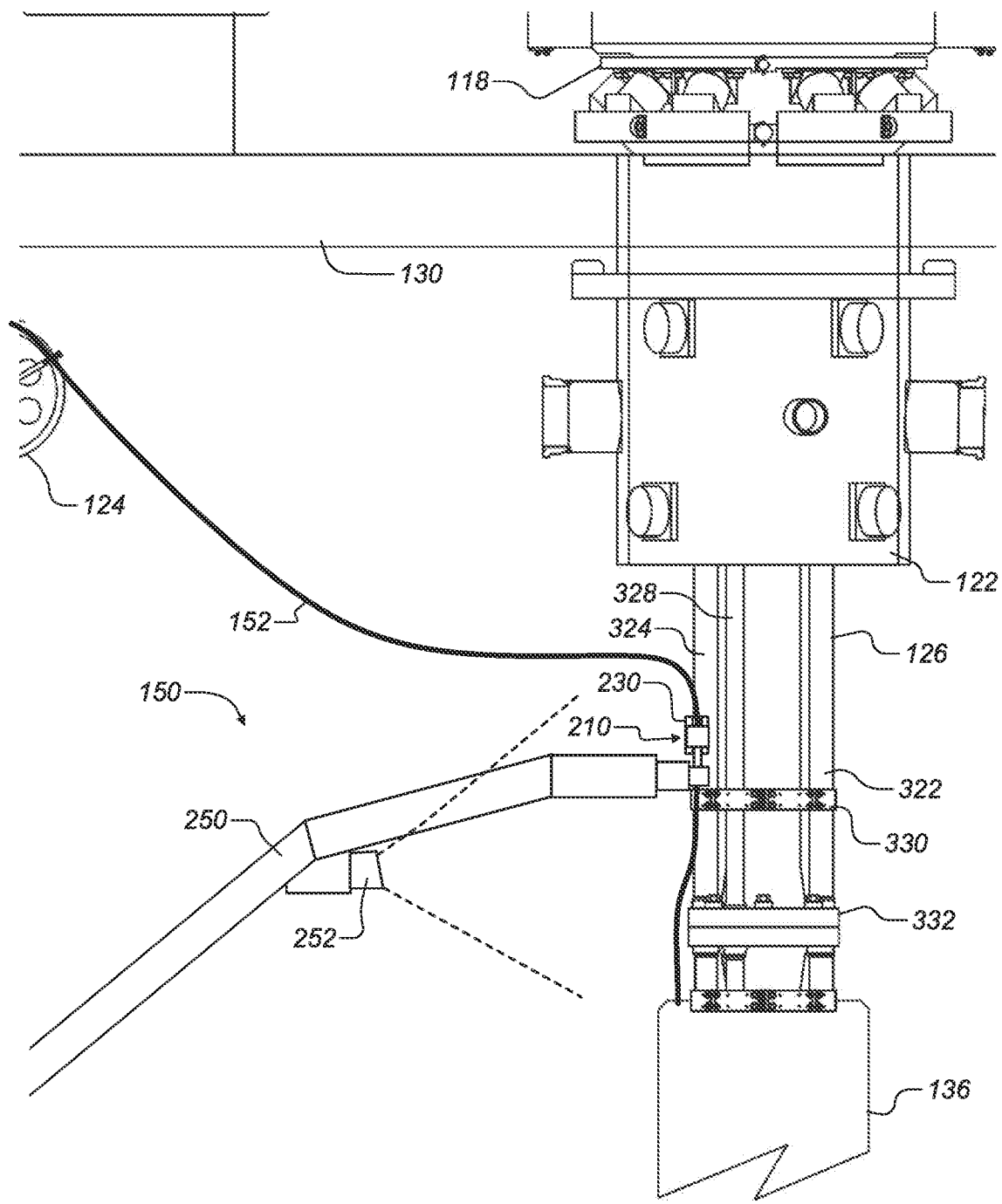
Figure 3C:
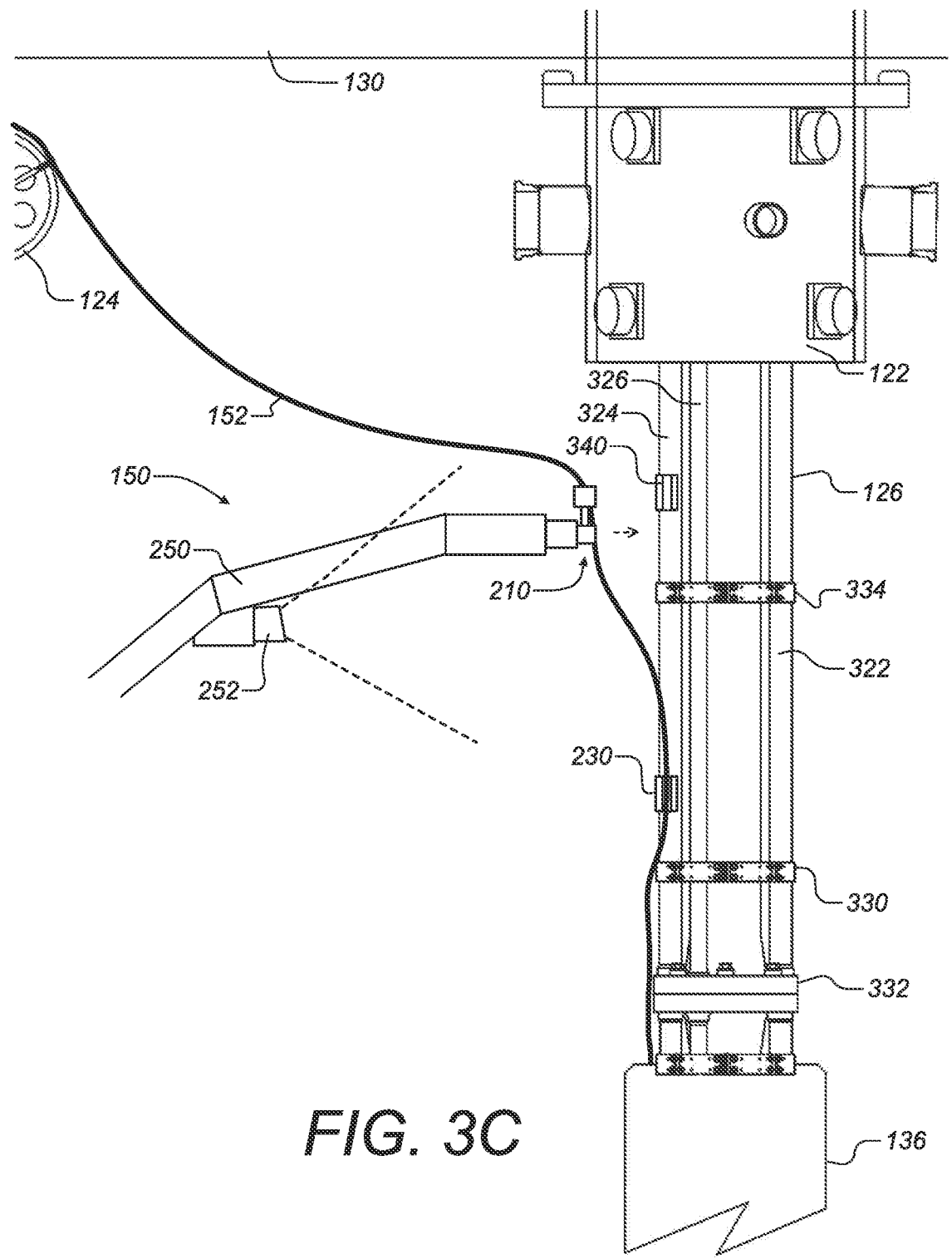

FIGS. 3A-3C are a series of side views showing further details of the operation of a cable management system to securely install cable(s) to marine drilling riser, according to some embodiments. In FIG. 3A, arm 250 is shown with handler 210 guiding the MUX cable 152 onto clamp 230, as shown by the dashed arrow. The riser joint 126 is shown to include a main riser bore 320, and auxiliary lines 322, 324 and 326. The riser joint 126 also includes lower flange 332 and clamp 330. As mentioned supra, the cable clamps are pre-installed onto the riser joints. In this case the clamp 230 is installed onto auxiliary line 324. FIG. 3B shows the MUX cable 152 being installed onto clamp 230 by handler 210 and arm 250. FIG. 3C shows the arm 250 and handler 210 positioning to install the mux cable 152 onto another clamp 340. Note that in general while two clamps 230 and 340 are shown on a single riser joint 126, in many cases only one clamp can be used per riser joint. According to some other embodiments, more than one clamp can be used per riser joint. Note also that in most cases the cable 152 is installed onto the clamp on the riser joint while the joint is stationary, such as when it is being held by the spider while the next riser joint is being retrieved, positioned and attached to the riser joint being held in the spider.

Figure 4A:
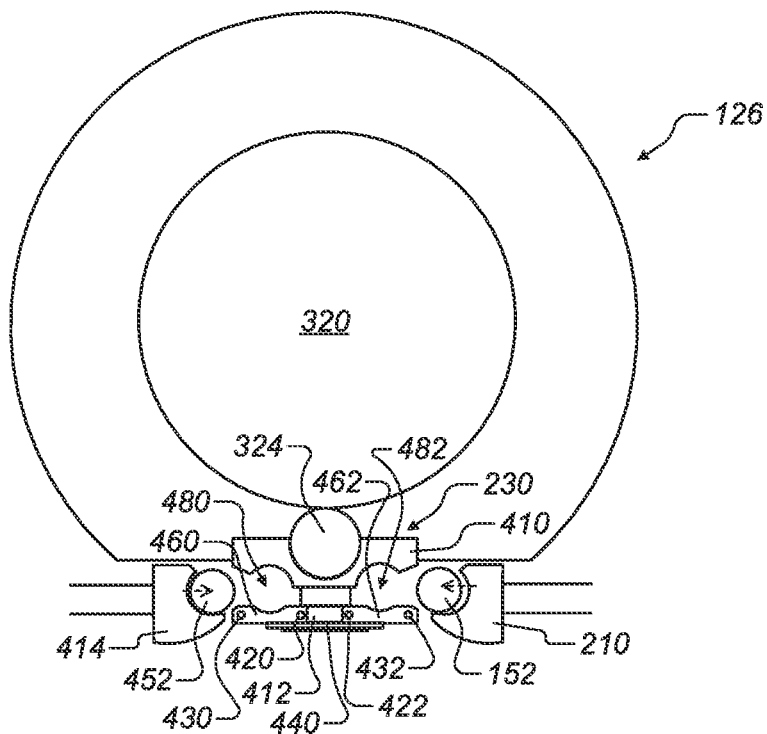
FIGS. 4A and 4B are top and side views, respectively, of a cable clamp and cable handler forming part of a cable management system, according to some embodiments.
Figure 4B:
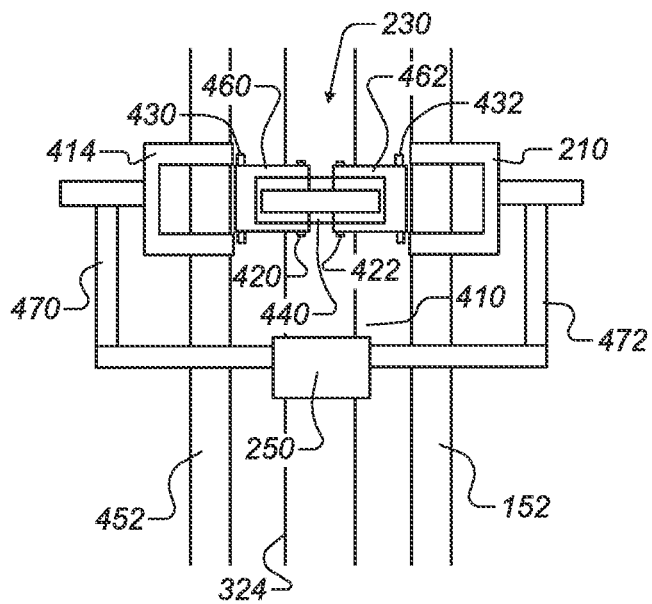

FIGS. 4A and 4B are top and side views, respectively, of a cable clamp and cable handler forming part of a cable management system, according to some embodiments. In this case, clamp 230 is a fixed clamp installed on auxiliary line 324 of riser joint 126. In this case, the clamp 230 is configured to accept two mux cables 152 and 452 being handled by handler 210 and 414, respectively. The fixed clamp 230 includes two halves 410 and 412. The inner half 410 is fixed and the outer half 412 is hinged. The outer half 412 includes left and right clamp levers 460 and 462 that are hinged at pins 420 and 422 in the middle section. The clamp levers 460 and 462 also have cam pins 430 and 432 near their outer edges. The clamp levers 460 and 462 are bias towards a "closed" position, as shown in FIG. 4A, by spring 440. The outer edges of the handlers 210 and 414 have a curved profile as shown. When the handler 210 and 414 are moved towards the center (towards each other) as shown by the dashed arrows, the curved edges of handlers 210 and 414 engage with pins 430 and 432, and thereby tend to open the clamp levers 460 and 462 against the spring force of spring 440. The opening of the clamp levers 460 and 462 and continued inward motion of the handlers 210 and 414 allow the MUX cables 452 and 152 slide into the circular slots 480 and 482 formed by the inner and outer halves 410 and 412. When the handlers 210 and 414 are retracted (the opposite of the dashed arrows), the spring 440 will close the clamp levers 460 and 462 to the closed position and the MUX cables 452 and 152 will be securely held by the clamp 230. FIG. 4B, shows a side view and the robotic arm 250 can be seen with left and right link arms 470 and 472 shown that are attached to handlers 414 and 210, respectively.

Figure 5A:
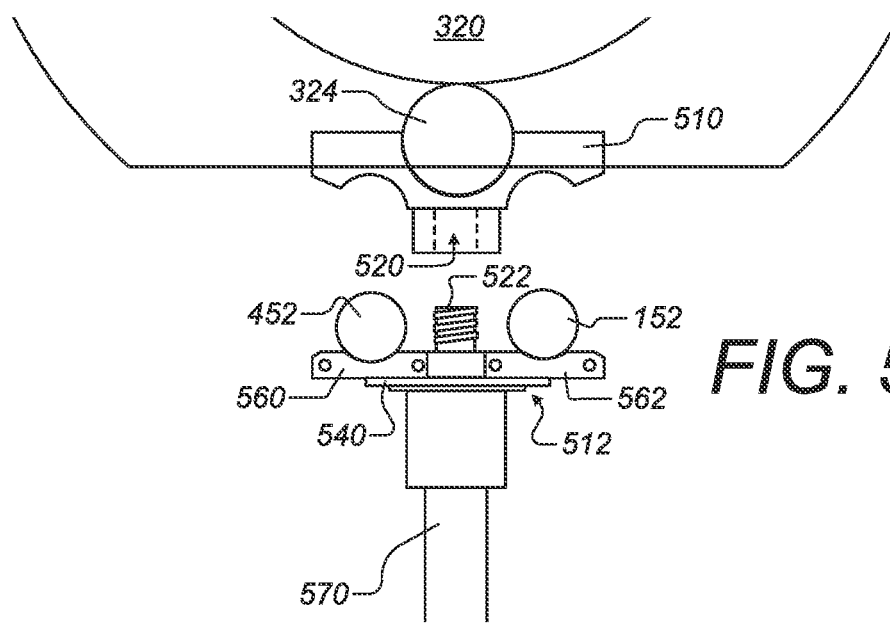
FIGS. 5A and 5B are top and side views, respectively, of a cable clamp and cable handler forming part of a cable management system, according to some other embodiments.
Figure 5B:
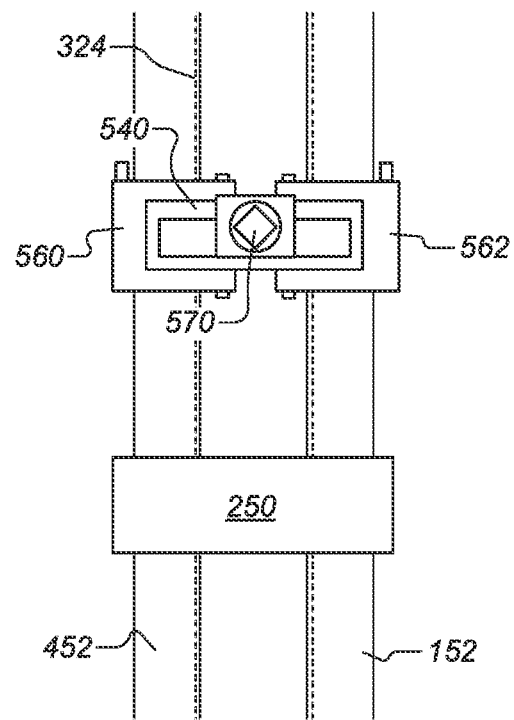

FIGS. 5A and 5B are top and side views, respectively, of a cable clamp and cable handler forming part of a cable management system, according to some other embodiments. In this variation clamp 230 includes an inner half 510 that is fixed to the auxiliary line 324, and an outer half 512 that is attached the robotic arm link 570 of robotic arm 250. In this case, the outer half 512 also serves as the cable handler, such as handler 210 shown in many of the other figures. The outer half 512 includes right and left levers 560 and 562 that are biased with a spring 540. The outer half 512 brings the cables 451 and 152 towards the inner half 510. The robotic arm linkage 570 is configured to screw the threaded portion 522 into a threaded opening 520 formed in inner half 510. FIG. 5B shows a side view in which the robotic arm 250 is shown, and according to some embodiments, the arm 250 can include a portion that uses the auxiliary line 324, or other portion of the riser joint for aiding in gaining proper alignment for screw 522 to mate with opening 520.

Figure 6A:
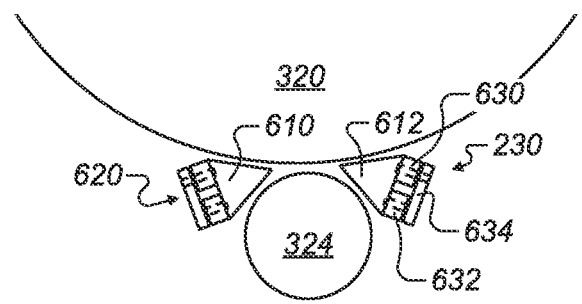
FIGS. 6A-6F show a number of views of mechanisms for securely clamping cable to drilling riser joints, according to various embodiments.
Figure 6B:
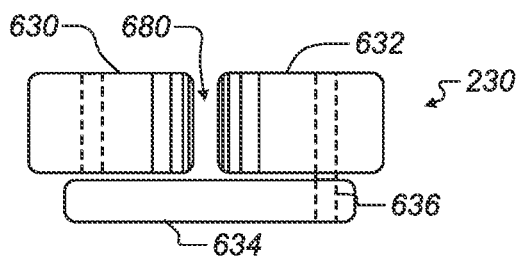
Figure 6E:
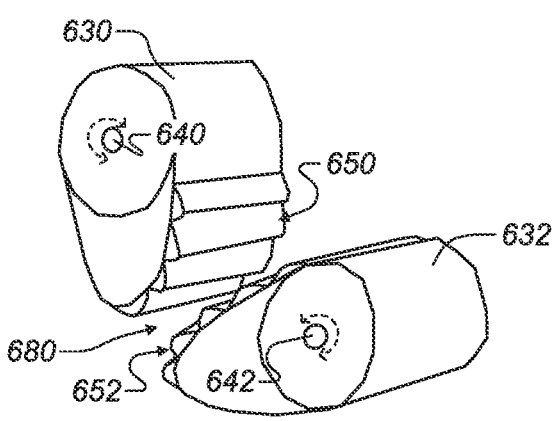
Figure 6C:
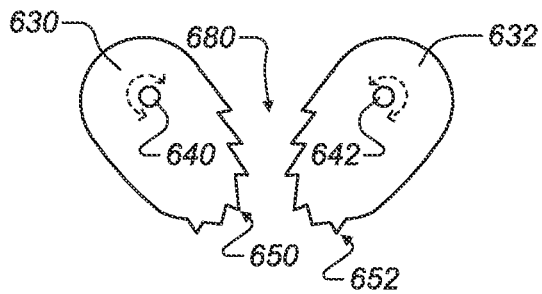
Figure 6D:
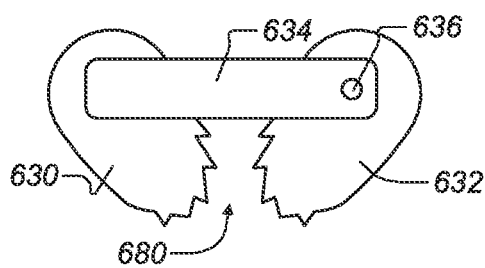

FIGS. 6A-6F show a number of views of mechanisms for securely clamping cable to drilling riser joints, according to various embodiments. FIG. 6A is a top view showing two cam-cleat style clamping mechanisms, 230 and 620, mounted on either side of an auxiliary line 324 of a riser joint (e.g. riser joint 126 shown in FIG. 1). The mechanisms 230 and 620 are held in the space between the auxiliary line 324 and main riser bore 320 as shown with triangular mounts 610 and 612. Additional securing components such as straps and the like are not shown for clarity. The arrangement shown in FIG. 6A results in a relatively low-profile arrangement. FIG. 6B is a top view showing more detail of cam-cleat type cable clamping mechanism 230. The mechanism 230 includes two cam cleats 630 and 632. Also shown is pivoting latch 636 that can provide added security holding the cable with the space 680 between the cam-cleats. FIGS. 6C and 6D are side views showing a version without a latch (FIG. 6C) and with a latch (FIG. 6D). In FIG. 6C it can be seen that cam-cleat 630 and 632 rotate about pivots 640 and 642, respectively, as shown by the dashed arrows. According to some embodiments, the cam-cleats are spring biased to force the cam-cleat towards each other. As shown the cam-cleats 630 and 632 have teeth 650 and 652 that are shaped to engage with the insulation of the cable being held in space 680 and preventing slippage of the cable upwards relative to the riser joint. In FIG. 6D. the latch 634 is shown the can open and close by pivoting about a pin 636 for added security. FIG. 6E shows a perspective view of the cam-cleats without the latch.

Figure 6F:
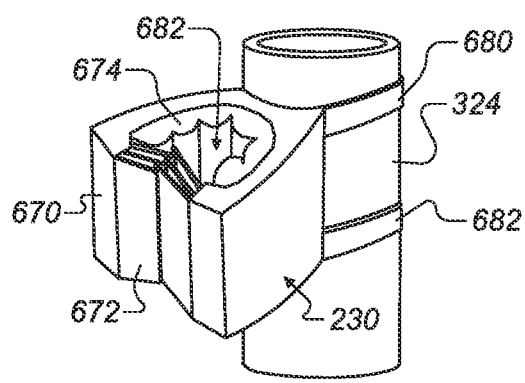

FIG. 6F is a perspective view of gate-based clamping mechanism, according to some embodiments. The clamp 230 in this case includes a "C" shaped body 670 that is secured to the auxiliary line 324 using straps 680 and 682. The cable (not shown) is held within the space 682 by a series of gates 672 that are configured to allow entry while resisting exit as shown. The gates can be made of a flexible material to allow the desired amount of compliance. According to some embodiments, the gates can include spring mechanisms to bias the gates towards the "closed" position. An elastomer 674 is also shown that adds friction to prevent longitudinal relative movement between the cable and riser joint.

Figure 7:
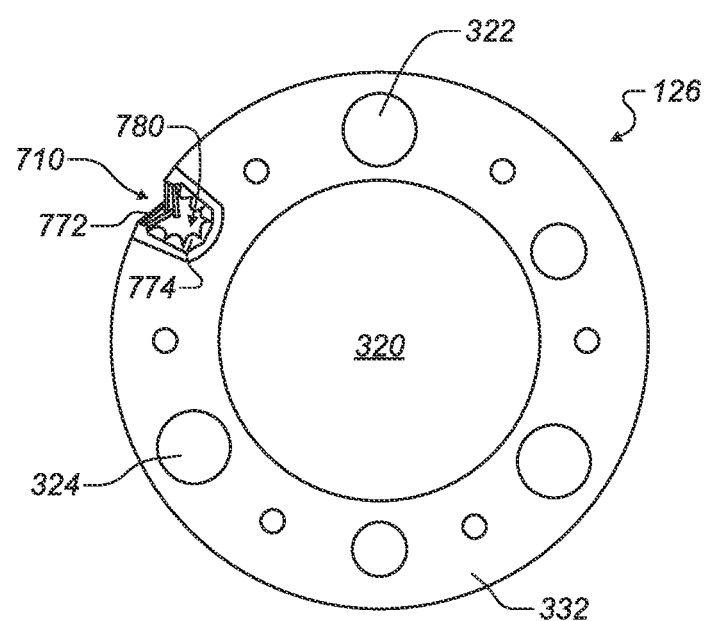
FIG. 7 is top view of a slotted riser joint flange configured to securely hold a MUX cable to drilling riser joints, according to some embodiments.

FIG. 7 is top view of a slotted riser joint flange configured to securely hold a MUX cable to drilling riser joints, according to some embodiments. In this case, the clamping mechanism 710 is incorporated with the riser flange 332 of riser joint 126 (shown in FIG. 1). In this arrangement, all of the riser joint flanges are modified to include an identical or similar mechanism such as slotted clamping mechanism 710. The slotted mechanism is formed in a space where no auxiliary line is present. In the case shown there are a series of gates 772 for holding the MUX cable (not shown) within space 780. The gates 772 can be identical or similar to gates 672 described infra and shown in FIG. 6F. The mechanism 710 can also include elastomer 774 to provide friction for resisting longitudinal movement of the cable relative to the riser joints. The gates 772 and elastomer 774 are configured such that only a push or pull force in a direction radial to the central riser bore 320 is needed to attach or remove, respectively, the MUX cable to or from the clamping mechanism 710. The "fingers" of gates 772 are configured to be flexible enough to move under a prescribed amount of force perpendicular to the OD of the flange. As in the case of gates 672, the flexibility of the gates 772 can be provide by the construction material of the fingers or from other assembled means such as from springs.

Figure 8:
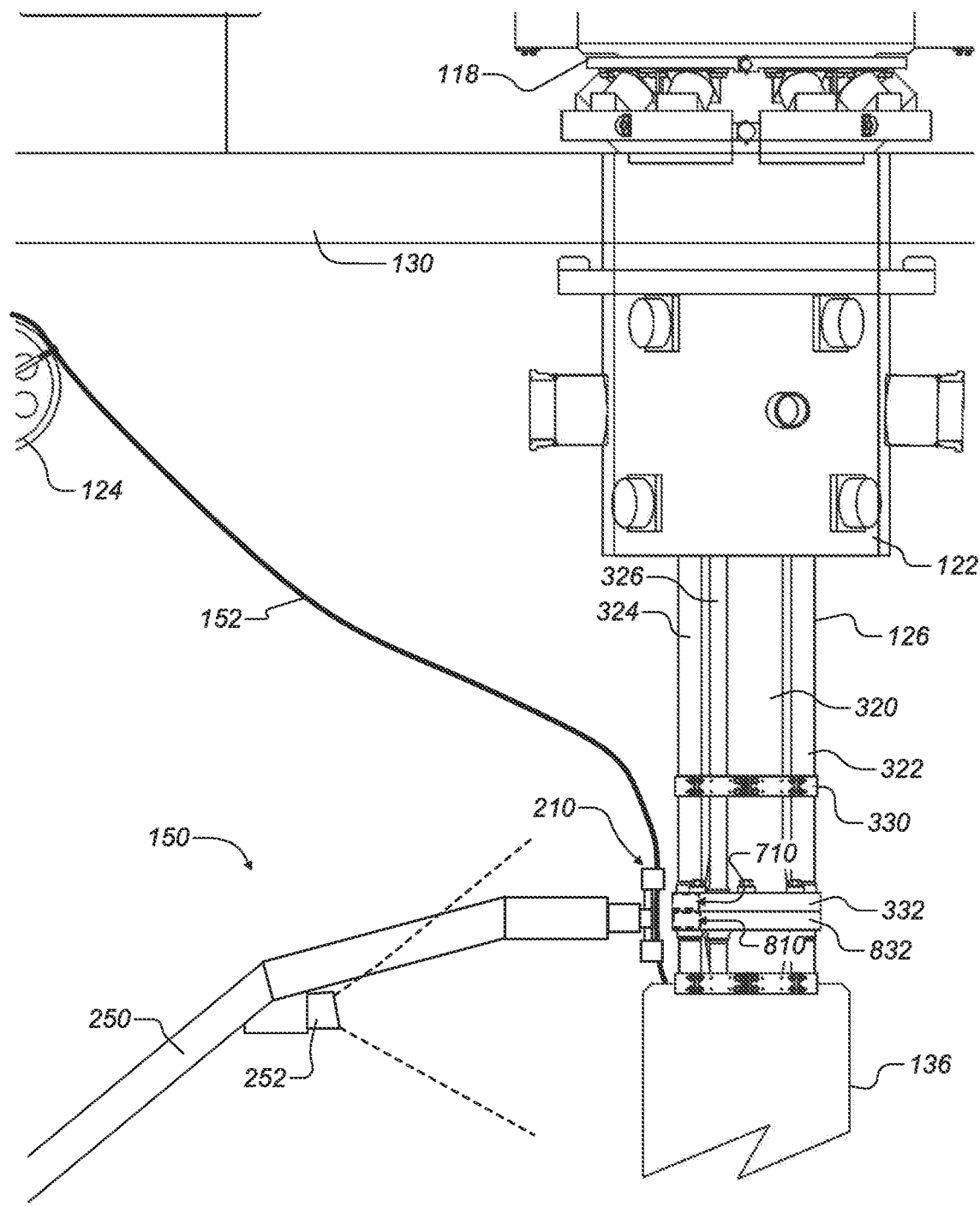
FIG. 8 is a side view showing a robotic arm and cable handler inserting a cable into riser flanges having slotted clamping mechanisms, according to some embodiments.

FIG. 8 is a side view showing a robotic arm and cable handler inserting a cable into riser flanges having slotted clamping mechanisms, according to some embodiments. The lower flange 332 of riser joint 126 includes slotted clamping mechanism 710 as shown in FIG. 7. The upper flange 832 of riser joint 136 has an identical (or similar) slotted clamping mechanism 810. The robotic arm 250 includes a handler 210 that in this case includes two heads that are spaced apart to pass above and below the two flanges 332 and 832 as shown.

Although most of the foregoing has been described with respect to MUX cable management for marine drilling risers, according to some embodiments, the techniques described herein are applied to cable management with other types or risers such as tie-back drilling riser and production risers that have auxiliary tubes or lines.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for" or "step for" performing a function, it is intended that such elements are to be interpreted under 35 U.S.C. 112(f). However, for any claims containing elements designated in any other manner, it is intended that such elements are not to be interpreted under 35 U.S.C. 112(f). While the subject disclosure is described through the above embodiments, it will be understood by those of ordinary skill in the art, that modification to and variation of the illustrated embodiments may be made without departing from the concepts herein disclosed.

What is claimed is:

1. A drilling riser cable management system configured to clamp an electrical cable to riser joints for use in a drilling process, the drilling riser cable management system comprising:
    a plurality of clamping mechanisms that are pre-installed to drilling riser joints prior to being run; and
    a mechanical cable handling mechanism configured to securely install the electrical cable to each of the plurality of clamping mechanisms without relying on human manipulation of the cable,
    wherein each of said plurality of clamping mechanisms includes a spring biased hinged member that is actuated at least in part by engagement of a shaped surface on the handling mechanism, and
    wherein the shaped surface on the handling mechanism is a cam surface configured to engage a pin mounted to the hinged member.

2. The drilling riser cable management system according to claim 1 further comprising a robotic arm system mounted to the mechanical cable handling mechanism, the robotic arm system configured to move the cable handling mechanism to a location in the proximity of at least one of the clamping mechanisms.

3. The drilling riser cable management system according to claim 1 further comprising a video imaging system configured to capture images to facilitate secure installation of the cable to each of the clamping mechanisms.

4. The drilling riser cable management system according to claim 1 wherein the electrical cable is a MUX cable configured to transfer electrical signals from topside equipment to blowout preventer (BOP) equipment.

5. The drilling riser cable management system according to claim 1 wherein each of the clamping mechanisms are configured to securely hold more than one electrical cable.

6. The drilling riser cable management system according to claim 1 wherein each of the plurality of clamping mechanisms is fixed to an auxiliary line of one of the riser joints.

7. A method of clamping an electrical cable to riser joints, the method comprising:
    actuating a mechanical cable handling mechanism with a robotic arm, the actuation securely installing an electrical cable onto a clamping mechanism that is mounted to a drilling riser joint, while the riser joint is being suspended from a drill floor,
    wherein the installing of the electrical cable onto said clamping mechanism does not rely on human manipulation of the cable,
    wherein the clamping mechanism includes a spring biased hinged member that is actuated at least in part by engagement of a shaped surface on the mechanical cable handling mechanism, and
    wherein the shaped surface on the mechanical cable handling mechanism is a cam surface configured to engage a pin mounted on the hinged member.

8. The method of claim 7 wherein the clamping mechanism is fixed to an auxiliary line of the riser joint.

* * * * *